United States Patent
Kneidel

(10) Patent No.: US 8,931,766 B2
(45) Date of Patent: Jan. 13, 2015

(54) CENTRIFUGAL HYSTERESIS PACKAGE

(75) Inventor: Craig Kneidel, Massillon, OH (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 696 days.

(21) Appl. No.: 13/208,498

(22) Filed: Aug. 12, 2011

(65) Prior Publication Data

US 2012/0038092 A1    Feb. 16, 2012

Related U.S. Application Data

(60) Provisional application No. 61/373,510, filed on Aug. 13, 2010.

(51) Int. Cl.
*F16M 1/00* (2006.01)
*F16F 15/129* (2006.01)

(52) U.S. Cl.
CPC .................. *F16F 15/129* (2013.01)
USPC .......... 267/140.2; 267/1.5; 267/164; 267/158

(58) Field of Classification Search
USPC ........... 188/378–380; 267/164, 165, 1.5, 158, 267/228, 229, 242; 464/180; 192/200–202, 192/207
See application file for complete search history.

(56) References Cited

U.S. PATENT DOCUMENTS

| | | | | |
|---|---|---|---|---|
| 2,044,451 A | * | 6/1936 | Teetor | 267/1.5 |
| 2,044,453 A | * | 6/1936 | Troendly | 267/1.5 |
| 2,263,949 A | * | 11/1941 | Harle | 188/340 |
| 4,376,477 A | | 3/1983 | Loizeau | |
| 4,383,596 A | | 5/1983 | Jaeckel | |
| 4,465,172 A | | 8/1984 | Gatewood | |
| 4,640,402 A | | 2/1987 | Hartig et al. | |
| 4,657,122 A | | 4/1987 | Sakakibara et al. | |
| 4,813,295 A | * | 3/1989 | Drexl et al. | 192/201 |
| 4,974,051 A | * | 11/1990 | Matloubian et al. | 257/347 |
| 5,388,678 A | * | 2/1995 | Murata | 192/3.29 |
| 6,681,911 B2 | | 1/2004 | Kroll et al. | |
| 6,722,722 B1 | * | 4/2004 | Sturt et al. | 296/97.9 |
| 2009/0032364 A1 | | 2/2009 | MacDonald et al. | |

* cited by examiner

*Primary Examiner* — Melanie Torres Williams
(74) *Attorney, Agent, or Firm* — Simpson & Simpson, PLLC

(57) ABSTRACT

A damper assembly including a cover having at least one aperture therein, a flange operatively connected to the cover, and a spring having at least one leg engaged with a radially outer surface of the flange, the spring having at least one post engaged in the aperture of the cover, wherein engaging the post in the aperture preloads the spring against the radially outer surface of the flange for exerting a force on the damper.

15 Claims, 3 Drawing Sheets

CENTRIFUGAL HYSTERESIS PACKAGE

CROSS-REFERENCE TO RELATED APPLICATIONS

This application claims the benefit under 35 U.S.C. §119(e) of U.S. Provisional Application No. 61/373,510 filed Aug. 13, 2010 which application is incorporated herein by reference.

FIELD OF THE INVENTION

The invention broadly relates to torque converter damper assemblies, more specifically to damper assemblies which use centrifugal forces to modify or vary hysteresis during operation of a torque converter.

BACKGROUND OF THE INVENTION

Torque converters are well known in the art. Commonly, torque converters include a damper assembly for improving noise or resonance of the torque converter or components of the torque converter during operation.

An example of a typical constant friction torque converter damper is shown in FIG. 1. As shown, damper 10 includes covers 12 and 14 on either side of flange 16. Torque from piston plate 18 is transmitted to cover plates 12 and 14, typically via a riveted connection. Cover plates 12 and 14 impart torque to compression springs 20 by contact with an edge of a spring window. Energy absorption is often accomplished through friction, sometimes called hysteresis, which includes friction from windup and unwinding of the damper plates. The hysteresis package generally consists of diaphragm (or Belleville) spring 22 which is placed between flange 16 and cover plate 14 to urge flange 16 into contact with cover plate 12. By controlling the amount of force exerted by diaphragm spring 22, the amount of friction torque can also be controlled. However, the amount of friction in this arrangement is constant regardless of the rotational speed of the assembly, whereas it has been found that high friction is desired for reducing resonance in low speed operations, while low friction is desired for reducing resonance in high speed operations. Additionally, in order for spring 22 to operate, it must be included about the entire circumference of the damper flange, and results in a significant quantity of scrap material when stamped during manufacture.

Such a damper arrangement is also described in several patent references, including United States Patent Publication No. 2009/0032364 (MacDonald et al.), which publication is hereby incorporated by reference in its entirety.

Accordingly, there have been attempts to modify or vary the friction in a damper during operation of the torque converter, such as to improve resonance more effectively at high and low rates of rotational speed, instead of constant friction at all rates of speed. Examples include: U.S. Pat. No. 4,640,402 (Hartig et al.), which shows a damper with a manually adjustable hysteresis for reduced tolerance variation; U.S. Pat. No. 4,465,172 (Gatewood), which shows a damper with friction that varies with the windup angle; U.S. Pat. No. 6,681,911 (Kroll et al.), which shows a damper with hysteresis that is adjustable by fluid pressure; and U.S. Pat. No. 4,376,477 (Loizeau), which shows a damper that uses a centrifugally acting element to engage and disengage spring sets. U.S. Pat. No. 4,640,402 (Hartig et al.), U.S. Pat. No. 4,465,172 (Gatewood), U.S. Pat. No. 6,681,911 (Kroll et al.), and U.S. Pat. No. 4,376,477 (Loizeau) are hereby incorporated by reference in their respective entireties.

The use of centrifugal clutches in torque converters is also generally known, however these clutches are known to increase friction with increased rotational speed, although the exact opposite is desired for damper's hysteresis package. Examples can be found in U.S. Pat. No. 4,657,122 (Sakakibara et al.) and U.S. Pat. No. 4,383,596 (Jaeckel). All of these various patents teach complicated assemblies consisting of numerous parts that require significant circumferential or angular space for installation.

BRIEF SUMMARY OF THE INVENTION

The present invention broadly comprises a damper assembly including a cover having at least one aperture therein, a flange operatively connected to the cover, and a spring having at least one leg engaged with a radially outer surface of the flange, the spring having at least one post engaged in the aperture of the cover, wherein engaging the post in the aperture preloads the spring against the radially outer surface of the flange for exerting a force on the damper. In one embodiment, the leg is operatively arranged to bend radially away from the flange due to centrifugal forces resulting from rotational movement of the damper, the centrifugal forces opposing and reducing the force exerted by the spring on the flange. In one embodiment, the leg includes a weight for facilitating tuning of a rate at which a change in speed of the rotational movement changes the force exerted by the spring. In one embodiment, the weight is a rivet received in a hole in the leg. In one embodiment, the flange is secured between the cover and a second cover. In one embodiment, the aperture is operatively arranged to receive a rivet for connecting the cover to the second cover, and wherein upsetting the rivet locks the post in the aperture for preloading the spring. In one embodiment, the second cover includes at least one second aperture, the spring element includes at least one second post, and the at least one second post is engaged in the at least one second aperture.

A damper assembly including a first cover having at least one aperture therein, the aperture aligned in a substantially axial direction with respect to the damper assembly, the aperture operatively arranged for receiving a securing means, a flange housed between the first cover and a second cover, a spring element, the spring element having a body portion with at least one post extending in a substantially axial direction with respect to the damper assembly, the at least one post engaged in the aperture in the first cover, wherein at least one leg is generally extending circumferentially from the body for engagement with a radially outer surface of the flange, wherein engaging the securing means in the aperture in the first cover locks the post and the spring element in position and preloads the at least one leg of the spring element against the radially outer surface of the flange for exerting a force on the flange, wherein the at least one leg includes a free end, wherein the free end enables the leg to bend radially away from the flange due to centrifugal forces resulting from rotational movement of the damper in order to reduce the force exerted by the spring element on the flange. In one embodiment, the leg includes a weight for facilitating tuning of a rate at which the rotational movement reduces the force exerted by the spring. In one embodiment, the weight is a rivet received in a hole in the leg.

The current invention also broadly comprises a hysteresis package for providing friction in a torsional damper including a spring element having a body having at least one post protruding therefrom operatively arranged for engagement in a hole in the damper, and at least one leg extending from the body for engagement with a radially outer surface of the damper. In one embodiment, the at least one post is extending in a substantially axial direction with respect to the damper. In one embodiment, the at least one leg comprises two legs extending in generally opposite circumferential directions from the body of the spring element. In one embodiment, the at least one leg includes a weighted free end. In one embodiment, the package further comprises a securing means for securing a first cover plate of the damper to a second cover plate of the damper while also locking the spring in a preloaded state in which the at least one leg of the spring is pressed against the radially outer surface.

It is a general object of the present invention to provide a hysteresis package for a damper assembly of a torque converter which results in increased friction in the damper assembly during low speed operation and decreased friction in the damper assembly during high speed operation.

It is another general object of the present invention to provide a hysteresis package which is compact and does not result in much waste or scrap material during manufacture.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
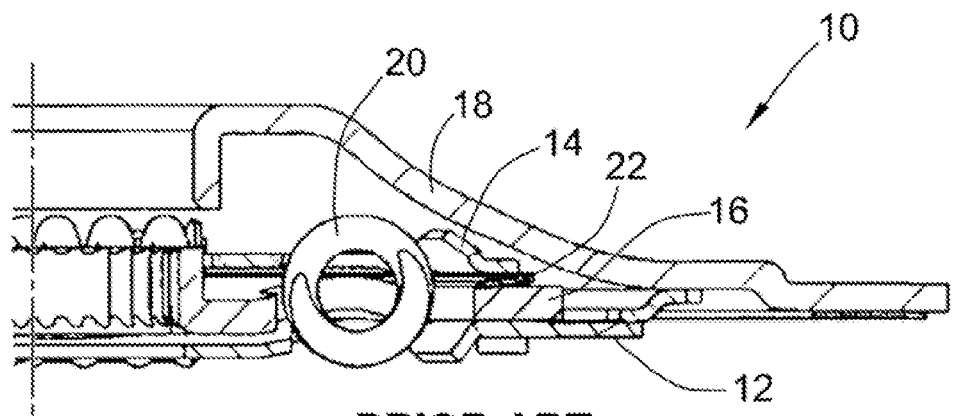
FIG. 1 is a cross-sectional view of a prior art damper assembly and piston plate.
Figure 2:
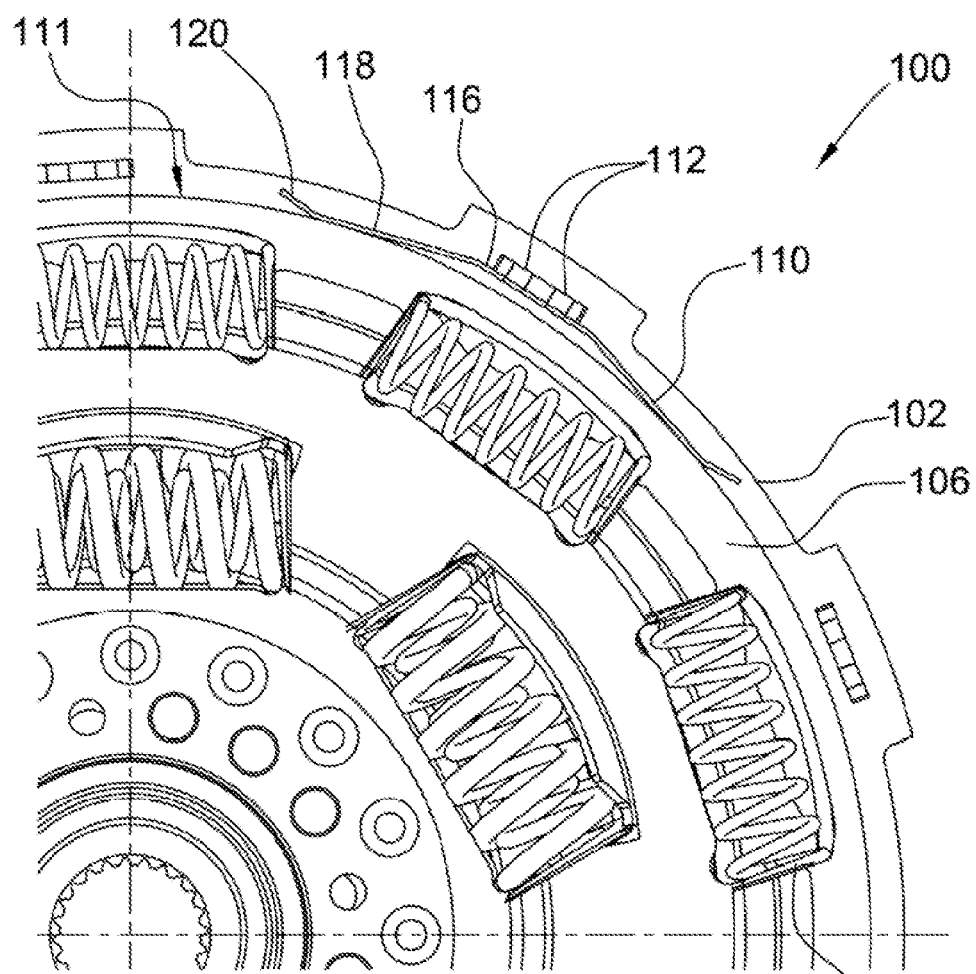
FIG. 2 is a front view of a damper assembly according to the current invention.
Figure 3:
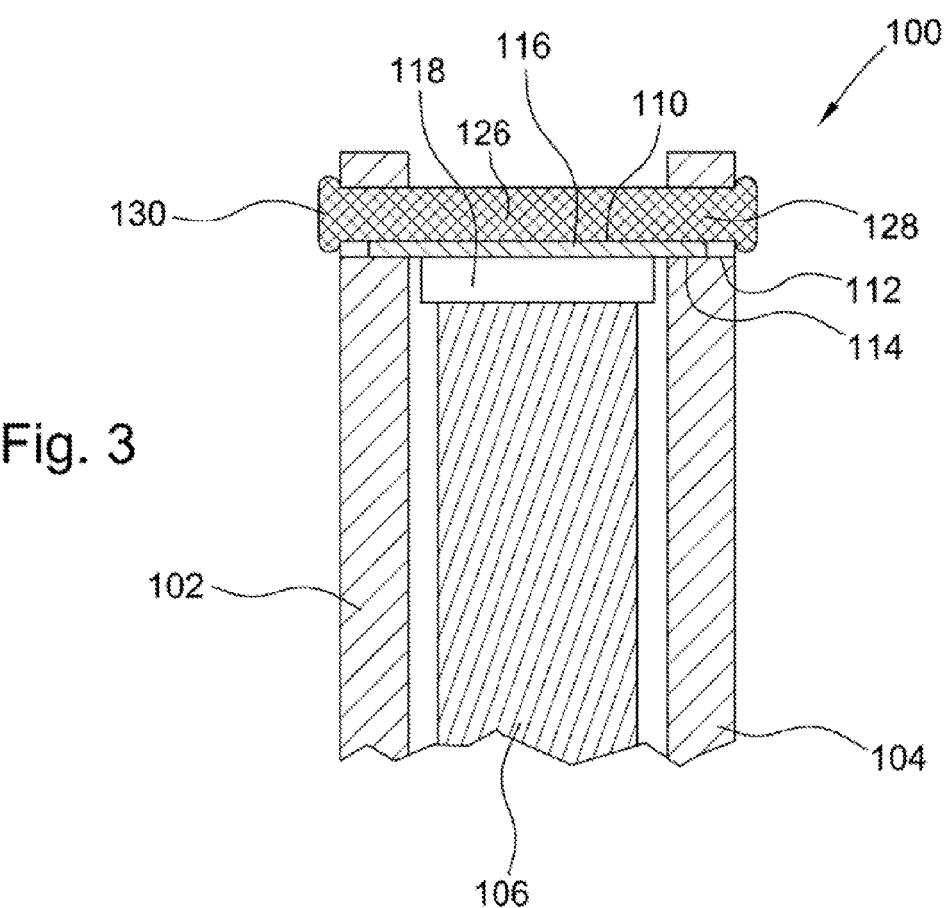
FIG. 3 is a cross-sectional view of a damper assembly according to the current invention.

Referring now to the figures, FIGS. 2 and 3 show a portion of damper assembly 100 according to the current invention. Damper assembly 100 includes cover plates 102 and 104 which are included on opposite sides of flange 106. The second cover plate is removed in FIG. 2 so that the flange is shown. It should be appreciated that cover plates 102 and 104 and flange 106 substantially resemble prior art plates 12 and 14 and flange 16, respectively, although any known cover plates and flange arrangements could be used for cover plates 102 and 104 and flange 106, and that these components are shown as one example only. Also like damper 10, damper 100 includes compression springs 108 in order to damper torque received from a piston plate. The piston plate and means for securing damper assembly 100 to the piston plate are not shown in the Figures, but could be any piston and corresponding means of securing known in the art, such as taught with respect to damper assembly 10 of FIG. 1. Damper 100 is shown with a greater number of springs than damper 10, but it should be appreciated that the exact number or configuration of the compression springs is not germane to the invention. Accordingly, only one such compression spring is labeled in FIG. 2 for clarity of discussion, any damper arrangement known in the art could be utilize the teachings of the current invention.

Figure 4:
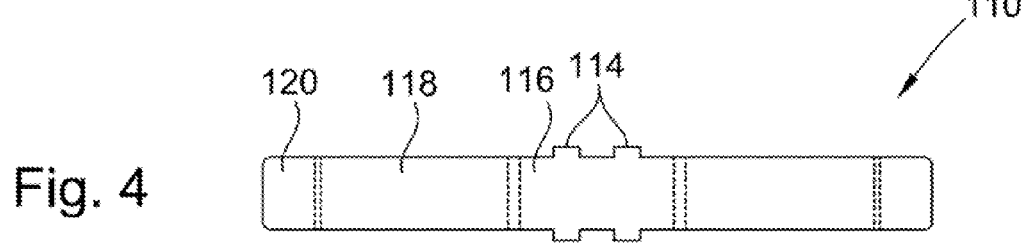
FIG. 4 is a top view of a spring of the damper assembly shown in FIG. 2.

Unlike damper 10, damper 100 does not include a diaphragm spring or Belleville washer to create friction axially against damper flange. Instead, damper assembly 100 includes spring 110 which acts on radially outer surface or circumference 111 of flange 106, as shown. Specifically, as can be seen in FIGS. 2 and 4, spring 110 resembles a stamped leaf spring. Body 116 of spring 110 includes two legs 118 that extend from opposite sides of the body, with legs 118 terminating in feet 120. As shown, the legs extend from the body both circumferentially and radially towards flange 106 until the legs engage against the flange, while the feet extend slightly radially and circumferentially away from flange 106.

As shown in FIG. 3, spring 110 includes posts 114 extending from opposite sides of body 116 in a generally axial direction with respect to the damper. From FIGS. 2-4, it can be seen that posts 114 are arranged for engagement in rivet holes 112 of cover 102. In the shown embodiment, rivets 126 are so-called sheet metal rivets generally resembling a thin H-shaped metal body similar in shape to body portion 116 of spring 110. As shown in the embodiment of FIG. 3, rivet 126 is laid over body 116 of spring 110 such that posts 128 of the rivet, corresponding to posts 114 of the spring, are aligned in each hole 112 and deformed or upset so as to form ends 130. The upsetting of the rivet locks posts 114 and therefore body 116 of spring 110 in place such that legs 118 of the spring are preloaded against flange 106 of the damper, which preloading provides the friction in the damper during the windup and unwinding of the flange. It should be appreciated that any other securing means could be used in order to preload the spring against the damper flange. For example, rivet 126 could be replaced by a bolt, pin, screw, plate, etc. for locking the spring in a preloaded state with respect to the damper flange. Moreover, the rivet or its equivalent could be used to secure the first cover to a piston, such as piston 18, or some other component of the torque converter, instead of a second cover.

Since feet 120 are free ends which are not secured to any other component, centrifugal forces resulting from rotational speed cause legs 118 and feet 120 to pull radially outward, away from surface 111 of the flange, reducing the preload against the flange and thereby also reducing hysteresis. That is, the centrifugal forces caused by rotational movement are generally opposite to the preloaded force of the spring on the damper flange (radially outward as opposed to radially inward). Thus, when subjected to centrifugal forces during rotation of the damper, the centrifugal forces cause the feet and legs to bend radially outwards away from the damper flange, lessening the force exerted by the spring, and thereby the amount of friction in the damper. It follows that since the feet and legs bend farther away from the damper flange as rotational speed increases (and therefore the centrifugal forces increase), faster rotational speeds will result in less friction and lower speeds will result in more friction. Advantageously, this behavior reflects the desired operation of a hysteresis package for a torque converter damper assembly; more friction at low speeds and less friction at higher speeds. Thus, the current invention arrangement dynamically reacts to the speed of rotation of the damper to more effectively reduce the resonance in the torque converter. Tuning of spring 110 of damper 100 to match the desired resonances of the system at various rotational speeds can be accomplished, for example, by selecting a proper stiffness of spring 110 and setting a predetermined preload force in order to establish a desired rate at which changing rotational speed changes the force exerted by the spring.

Figure 5:
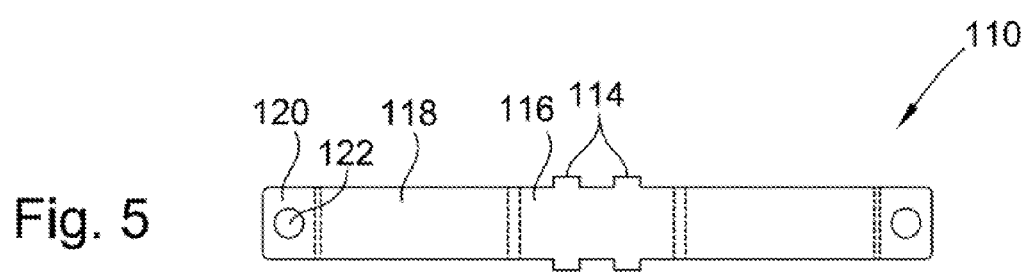
FIG. 5 is a top view of a spring of the damper assembly, wherein the spring includes weighted ends; and, FIG. 6 is a damper assembly including the spring of FIG. 5.
Figure 6:
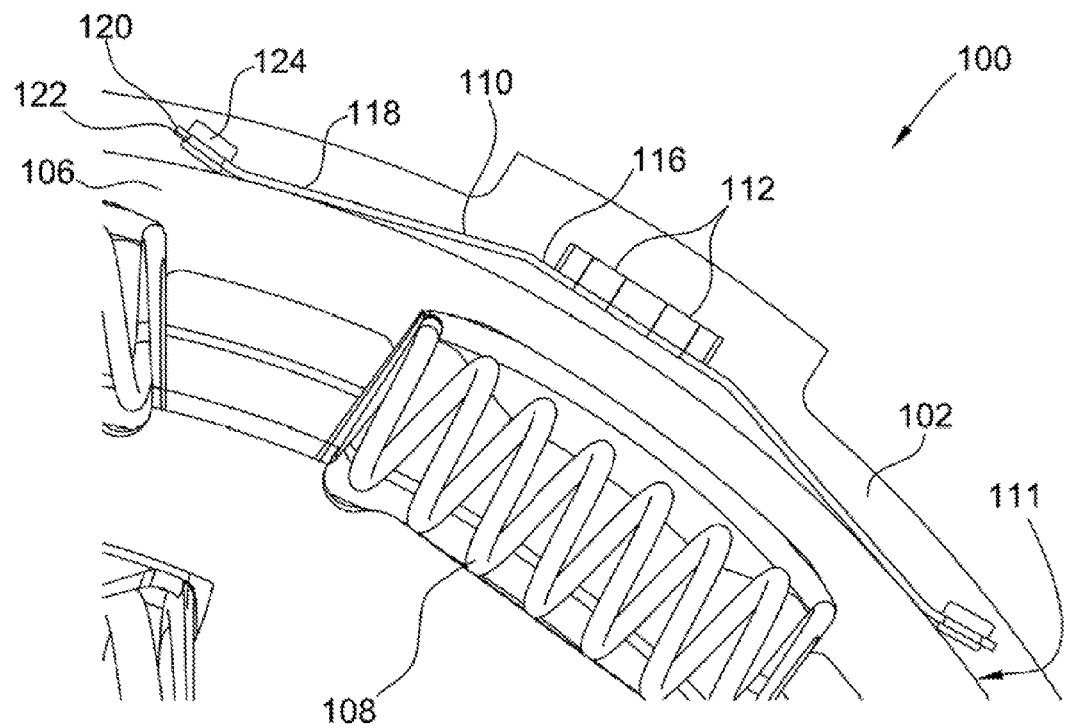

In the embodiment shown in FIG. 5, each foot 120 of spring 110 includes aperture 122. As shown in FIG. 6, apertures 122 are arranged to receive weights 124. Weights 124 could be, for example, rivets installed through apertures 122, or any other weighted components. The use of weights 124 may result in an easier or more accurate tuning of spring 110, since the mass of weights 124 can easily be adjusted to tune the friction under various speeds for specific noise, vibration, and hysteresis requirements for different damper assembly or torque converter applications.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A damper assembly comprising:
    a cover having at least one aperture therein;
    a flange operatively connected to said cover and including
        a radially outermost surface forming a radially outermost circumference of the flange; and,
    a spring having:
        at least one leg engaged with the radially outermost surface of said flange; and,
        at least one post engaged in said aperture of said cover, wherein engaging said post in said aperture preloads said spring against said radially outer surface of said flange for exerting a force in a radially inward direction on the flange.

2. The damper of claim 1, wherein said leg is operatively arranged to bend radially away from said flange due to centrifugal forces resulting from rotational movement of said damper, said centrifugal forces opposing and reducing said force exerted by said spring on said flange.

3. The damper assembly of claim 1, wherein said leg includes a weight for facilitating tuning of a rate at which a change in speed of said rotational movement changes said force exerted by said spring.

4. The damper assembly of claim 3, wherein said weight is a rivet received in a hole in said leg.

5. The damper assembly of claim 1, wherein said flange is secured between said cover and a second cover.

6. The damper assembly of claim 5, wherein said aperture is operatively arranged to receive a rivet for connecting said cover to said second cover, and wherein upsetting said rivet locks said post in said aperture for preloading said spring.

7. The damper assembly of claim 5, wherein said second cover includes at least one second aperture, said spring element includes at least one second post, and said at least one second post is engaged in said at least one second aperture.

8. A damper assembly comprising:
    a first cover having at least one aperture therein, said aperture aligned in a substantially axial direction with respect to said damper assembly, said aperture operatively arranged for receiving a securing means;
    a flange housed between said first cover and a second cover;
    a spring element, said spring element having a body portion with at least one post extending in a substantially axial direction with respect to said damper assembly, said at least one post engaged in said aperture in said first cover, wherein at least one leg is generally extending circumferentially from said body for engagement with a radially outer surface of said flange;
    wherein engaging said securing means in said aperture in said first cover locks said post and said spring element in position and preloads said at least one leg of said spring element against said radially outer surface of said flange for exerting a force on said flange;
    wherein said at least one leg includes a free end, wherein said free end enables said leg to bend radially away from said flange due to centrifugal forces resulting from rotational movement of said damper in order to reduce said force exerted by said spring element on said flange.

9. The damper assembly of claim 8, wherein said leg includes a weight for facilitating tuning of a rate at which said rotational movement reduces said force exerted by said spring.

10. The damper assembly of claim 9, wherein said weight is a rivet received in a hole in said leg.

11. A hysteresis package for providing friction in a torsional damper comprising:
    a spring element including:
        a body having at least one post protruding therefrom operatively arranged for engagement in a hole in a cover for said damper; and,
        at least one leg extending from said body for:
            engagement with a radially outer surface of a flange for said damper; and,
            applying a force in a radially inward direction on the radially outer surface of the flange, wherein the radially outer surface of the flange faces radially outward.

12. The hysteresis package recited in claim 11 wherein said at least one post is extending in a substantially axial direction with respect to the said damper.

13. The hysteresis package recited in claim 11 wherein said at least one leg comprises two legs extending in generally opposite circumferential directions from said body of said spring element.

14. The hysteresis package recited in claim 11 wherein said at least one leg includes a weighted free end.

15. The hysteresis package recited in claim 11 comprising a securing means for securing a first cover plate of said damper to a second cover plate of said damper while also locking said spring in a preloaded state in which said at least one leg of said spring is pressed against said radially outer surface.

* * * * *